(12) United States Patent
Bielsa López et al.

(10) Patent No.: US 10,819,453 B2
(45) Date of Patent: Oct. 27, 2020

(54) METHOD FOR DETERMINING GEOMETRIC INFORMATION OF DEVICES IN MILLIMETER-WAVE NETWORKS

(71) Applicant: FUNDACION IMDEA NETWORKS, Laganes, Madrid (ES)

(72) Inventors: Guillermo Bielsa López, Madrid (ES); Joan Palacios Beltran, Madrid (ES); Paolo Casari, Madrid (ES); Jörg Carsten Widmer, Madrid (ES); Adrian Carlos Loch Navarro, Madrid (ES)

(73) Assignee: FUNDACION IMDEA NETWORKS, Leganes, Madrid (ES)

( * ) Notice: Subject to any disclaimer, the term of this patent is extended or adjusted under 35 U.S.C. 154(b) by 0 days.

(21) Appl. No.: 16/365,953

(22) Filed: Mar. 27, 2019

(65) Prior Publication Data
US 2020/0252148 A1    Aug. 6, 2020

(30) Foreign Application Priority Data
Mar. 27, 2018    (ES) .................................. 201830297

(51) Int. Cl.
*H04W 64/00*    (2009.01)
*H04B 17/391*    (2015.01)
(Continued)

(52) U.S. Cl.
CPC ......... *H04B 17/391* (2015.01); *H04B 17/336* (2015.01); *H04B 17/373* (2015.01)

(58) Field of Classification Search
None
See application file for complete search history.

(56) References Cited

U.S. PATENT DOCUMENTS

| | | | |
|---|---|---|---|
| 2017/0142540 A1* | 5/2017 | Shirakata | H04B 7/0617 |
| 2019/0238207 A1* | 8/2019 | Pefkianakis | H04W 36/30 |
| 2019/0239235 A1* | 8/2019 | Pefkianakis | H04W 24/08 |

FOREIGN PATENT DOCUMENTS

| | | | | |
|---|---|---|---|---|
| CN | 103117964 A | | 5/2013 | |
| EP | 2911435 A1 | * | 8/2015 | ........... G01S 5/0215 |
| WO | WO-2018028798 A1 | * | 2/2018 | ........... H04W 64/003 |

OTHER PUBLICATIONS

Pillutla, L. et al. "Integrated Acquisition and Tracking Scheme for Channel Estimation in Millimeter Wave Wireless Networks" IEEE, 2017; 5 pages.

(Continued)

*Primary Examiner* — Ayanah S George
(74) *Attorney, Agent, or Firm* — Procopio, Cory, Hargreaves & Savitch LLP (57) ABSTRACT

A method for determining geometric information of mmWave network devices is provided, comprising collecting measures, by at least one of the devices, of signal strength and SNR of a transmission received from another device of the mmWave network; the step of estimating angle information of the received signal to generate a set of informed particles (Pi) comprising the initial values of the state of each informed particle input in a modified particle filter; the modified particle filter causing the evolution of the set of informed particles (Pi) and of past particles (Pp) to obtain a set of evolved particles (Pe) which at the same time evolves to obtain a set of posterior particles (PPost) delivered by the modified particle filter. Finally, the modified particle filter delivers as output the final values of the geometric information of at least one device extracted from the delivered set of posterior particles (PPost).

18 Claims, 4 Drawing Sheets

(51) Int. Cl.
    *H04B 17/373*     (2015.01)
    *H04B 17/336*     (2015.01)

(56)     References Cited

OTHER PUBLICATIONS

Mannesson, A. et al. "Tightly Coupled Positioning and Multipath Radio Channel Tracking" IEEE Transactions on Aerospace and Electronic Systems, Aug. 2016, pp. 1522-1533 (12 pages); vol. 52, No. 4.

Dardari, D. et al. "Indoor Tracking: Theory, Methods, and Technologies" IEEE Transactions on Vehicular Technology, Apr. 2015; pp. 1263-1276 (14 pages); vol. 64, No. 4.

Yoo, J. et al. "Sampling-based Tracking of Time-varying Channels for Millimeter Wave-band Communications" IEEE ICC 2017 Signal Processing for Communications Symposium, 2017; 6 pages.

Li, B. et al. "A Bayesian Approach for Nonlinear Equalization and Signal Detection in Millimeter-Wave Communications" IEEE Transactions on Wireless Communications, Jul. 2015; pp. 3794-3809 (16 pages); vol. 14, No. 7.

He, J. "Millimeter Wave MIMO Channel Tracking Systems" Globecom 2014 Workshop—Mobile Communications in Higher Frequency Bands; 2014; pp. 414-419 (6 pages).

Office Action for related Spanish Application No. P201830297, dated Jan. 22, 2019; 7 pages.

\* cited by examiner

METHOD FOR DETERMINING GEOMETRIC INFORMATION OF DEVICES IN MILLIMETER-WAVE NETWORKS

CROSS-REFERENCE TO RELATED APPLICATIONS

This application claims priority to Spanish Patent Application No. P201830297 filed on Mar. 27, 2018, the contents of which are incorporated herein by reference.

FIELD OF THE INVENTION

The present invention is applicable in the telecommunications sector. More specifically, it relates to millimeter-wave (mmWave) networks and systems for the wireless locating of client devices in millimeter-wave scenarios.

The present invention relates to a method for determining geometric information (angles, orientation, and properties of position) of millimeter-wave network devices (for example, IEEE 802.11ad) using a modified particle filter (PF).

BACKGROUND OF THE INVENTION

The millimeter-wave communications impose strict hardware requirements. The very high frequency, the bandwidth, and the data rate require a high processing speed in the transceivers. To assure that it is viable to produce hardware intended for end consumers, the design of commercial devices is often adapted to specific applications.

Millimeter-wave devices (mmWave network devices) generally use arrays of antennas for transmission, resulting in the formation of directional radiation patterns focusing the emission of the signal towards given azimuth and elevation angles. Although the simplified theoretical models that are used, for example, in standards today assume ideal emission patterns which only focus on the desired directions and do not emit any radio power in other directions, the commercial hardware on the market usually produces highly irregular radiation patterns. For example, commercial access points (APs) according to standard IEEE 802.11ad use low-cost phased array antennas which result in radiation patterns with extremely irregular shapes which often lack a clearly defined main lobe in a specific direction and can even have two or more lobes having a power similar to the main lobe.

Furthermore, AP firmware uses approximate signal-to-noise ratio (SNR) values when selecting the best transmission sector. While that is sufficient for communications in scenarios with a limited number of client nodes, this strongly limits other cases of millimeter-wave use, such as high-precision positioning.

Nevertheless, the large bandwidth available in the 60 GHz band, as well as the large number of elements in the phased array antennas allows designing, in principle, high-precision positioning systems. The integration of said systems with standard protocols (for example, IEEE 802.11ad) is crucial for the deployment of the next generation of services based on the location of the client nodes, but it also poses a challenge and limits the available design options. Furthermore, current 60 GHz hardware often uses quasi-omnidirectional patterns for reception, and therefore does not take measurements for identifying the best pattern in the millimeter-wave receiver. This even further limits the angle information that said commercial hardware can provide for positioning. Given that commercial 60 GHz hardware only provides poorly approximated channel state information and uses highly irregular transmission patterns as a result of its low-cost design, it is very difficult to estimate the angles of departure (AoD) of the client signal, and even more difficult to translate AoD information into position and orientation estimations.

In millimeter-wave networks, client devices typically communicate using highly directional transmission (TX) as well as electronic beamforming at reception (RX) to compensate for losses of propagation incurred by the millimeter-wave signal, and to cover sufficiently long communication distances. As a result, it is possible to take advantage of the beamforming operations to estimate the angles of departure (AoD) of the millimeter-wave signal from the transmitter and the angles of arrival (AoA) of the same signal in the receiver. In some cases, the transmitter or receiver communicates using quasi-omnidirectional instead of directional patterns, which eliminates the need for beamforming in that client device and improves robustness at the expense of shorter communication ranges. This in turn restricts the available angle information to only AoA (or AoD, respectively).

Finally, triangulation algorithms require that at least three APs are within the communication range of the client to determine the location thereof. Given that signal blocking in millimeter-wave networks is common, the presence of a sufficient number of APs cannot always be assured. Therefore, positioning systems that are able to handle situations in which information is missing must be designed.

In summary, it would be highly desirable to develop a system that implements both communication and locating functions in a low-cost millimeter wave commercial platform, and therefore suitable for the end consumer.

SUMMARY OF THE INVENTION

The present invention solves the problems mentioned above and overcomes the limitations of the state of the art, providing a method for determining the geometric properties (angles, orientation, and position) of a millimeter-wave device, even in the presence of the irregular radiation patterns typical of commercial hardware.

The present method works with only AoA, or only AoD, or both. In the context of the invention, AoA, AoD, and the combination thereof are together referred to as angle information. The angle information is obtained upon resolving a linear programming (LP) problem which produces a scattered angular spectrum. The orientation and position of the client device are jointly estimated through a modified particle filter (PF). The modification of the PF involves injecting particles referred to as "informed" particles, which represent possible reliable estimations of the position of the user, and are calculated by resolving a locating problem due to angle differences (ADoA).

The described method is applied to any millimeter-wave scenario including IEEE 802.11ad networks with access points (APs) and client devices, "millimeter-wave" mesh networks, "millimeter-wave" ad hoc networks, as well as "millimeter-wave" implementations of infrastructure made up of base stations, repeater terminals, and mobile clients. As an example, but without limiting the applicability of the current approach in any way, the present invention is applied to IEEE 802.11ad networks with APs and mobile clients, where it is assumed that the APs are stationary and the mobile clients are to be located. As the angle information is collected in different devices, a feedback mechanism is used to deliver the information to the components of the method which require it, such as the modified PF. For example, the modified PF can be executed in the AP, in which case the client devices use feedback mechanisms to send the angle information not detected directly by the AP.

In addition to determining the angle of arrival of the millimeter-wave signal, the proposed method determines the orientation and the location of the client.

The proposed method comprises two main blocks to enable locating a client despite the limitations of commercial devices given their low cost: i) a formulation of a simple linear programming (LP) problem which allows the network to estimate the angle of arrival of the millimeter-wave signal, such that said information is compatible with SNR values measured by the APs or clients for different transmission pattern choices; and ii) a modified particle filter (PF) which obtains estimations of the possible location of the device while the latter is moving. Most importantly, the block i) is not based on any simplifying hypothesis, such as the design of custom transmission patterns, the "triangular" shape of patterns, or the availability of phase information; additionally, the block ii) is based on a mechanism of low complexity for updating particles in the PF, and, in an informed manner, injecting new particles having a higher probability of being generated at the actual location of the client, thereby accelerating convergence of the PF and considerably improving its precision.

The present invention is based on an LP formulation which produces a scattered solution. This provides the necessary angle information. The number of estimated angles depends on the signal-to-noise ratio (SNR) quality and on the directivity of consumer hardware radiation diagrams. For example, in a network with APs and clients, the client carries out a transmission pattern training phase (or sector scan) by means of the sequential transmission of a message through each of its available patterns. All the APs in proximity of the client measure the quality of the corresponding received signal. Specifically, the SNR is collected so the access points receive the sector scanning messages sent by the client. Instead of relating each sector identifier with a specific angle, the transmission channel is broken down into a scattered representation which relates power with the angle information of each propagation path. Then the information from all the APs and all the patterns are merged together to estimate the location of the client. To that end, linear programming (LP) and Fourier analysis are used. Furthermore, to prevent locating errors due to blocking a modified PF is used to limit the locating error, even if a client is in the coverage area of less than three APs.

The modified PF handles the state of a particle, which typically includes the position, speed, and fitness of the particle. The particles in the modified PF evolve every time new angle measurements are received. The set of prior particles in the PF includes both posterior particles evolved during the prior PF steps and "informed" particles when they are available. In each iteration of the algorithm, new informed particles, the initial state of which is calculated from the information of the angle measured by resolving the corresponding ADoA problem, are generated. Therefore, informed particles have a higher probability of being generated in the actual location of the client, accelerating convergence of the PF and substantially improving its precision. The fitness of the particles, which represents the probability that the position of the particle is correct given the measurements, uses Fourier analysis applied to a smoothed version of the angular spectra determined through the initial solution of the LP problem. The fitness of the particles also takes into account the probability that the received SNR corresponds to the solution that is found.

In the event that the AP positions are unknown, the APs perform a self-learning phase, where all the angles of departure and arrival between every two APs that are within its communication range are determined by the APs themselves. Finally, a mean square error minimization problem is resolved to determine the positions of the APs.

The present invention uses only information that can be passively collected, such as SNR information generated by sector scans according to standard 802.11ad, for example. This information may furthermore be quantified with low granularity.

One aspect of the present invention relates to a method for determining the geometric information of client devices in millimeter-wave networks, comprising the following steps:
  collecting measures, by at least one of the devices of a millimeter-wave network, of a signal strength and a signal-to-noise-ratio (SNR) of a transmission received from another device of the millimeter-wave network;
  estimating the angle of arrival information of the received signals to generate a set of informed particles ($P_i$) input in a modified particle filter, the $P_i$ set comprising initial values of the state of each informed particle;
  the modified particle filter causing the evolution of the set of informed particles ($P_i$) and a set of past particles ($P_p$) which is randomly generated and input in the modified particle filter for initialization to obtain a set of evolved particles ($P_e$);
  causing the evolution of the set of evolved particles ($P_e$) to obtain a set of posterior particles ($P_{post}$) delivered by the modified particle filter;
  delivering the final values of the geometric information of at least one device obtained from the delivered set of posterior particles ($P_{Post}$), the geometric information obtained finally being delivered by the modified particle filter as departure values.

The present invention has a series of advantages with respect to the state of the art, which can be summarized as follows:
  The present invention converts imperfect antenna patterns and low-resolution SNR measurements into precise angle information. This is applied to the angle of departure information, the angle of arrival information, or both when they are available. The proposed method also works in the event that beamforming is used only for transmitting (or only for receiving) packets, and for receiving (respectively, transmitting) packets, the devices use a quasi-omnidirectional transmission pattern. Therefore, the algorithm also works in the event that only AoD or only AoA information is available;
  Information about the initial location and orientation of the clients or about the APs need not be known for the purpose of estimating angle information;
  The present invention can determine all angles, even between the APs themselves, through an LP formulation, based on the estimated angle information. The better the antenna patterns, the simpler the LP algorithms that can be used will be;
  The proposed method does not involve any overloading and modification of standard millimeter-wave protocols, such as 802.11ad, since the method only collects information which is available at the access points as a byproduct of operations that are carried out on a normal basis. Therefore, the device can be located with zero additional communication costs (except the feedback of location information to the data processing entity), as a result of the information collected by 802.11ad access points during the transmission pattern training phase;

The proposed method works in real time, since it can update the estimation of the location dynamically every time a device performs a sector scan;

The proposed method operates in actual scenarios and can be implemented in commercial APs communicating in the 60 GHz band using arrays of antennas with electronic beamforming and a very limited SNR resolution.

These and other advantages will become apparent in light of the detailed description of the invention.

DESCRIPTION OF THE DRAWINGS

For the purpose of aiding to better understand the features of the invention according to a preferred practical embodiment thereof and for the purpose of complementing this description, the following illustrative and non-limiting drawings are attached as an integral part of the said description.

PREFERRED EMBODIMENT OF THE INVENTION

The issues defined in this detailed description are provided to facilitate overall understanding of the invention. Accordingly, those skilled in the art will recognize that variations, changes, and amendments can be made to the embodiments described in the present specification without departing from the scope and the spirit of the invention. Furthermore, the description of well-known functions and elements has been omitted for the sake of clarity and concision.

The embodiments of the invention can be implemented in a range of platforms, operating systems and servers, devices, or applications. Any arrangement, implementation, or specific architecture presented herein is solely for illustrative and comprehension purposes and does not seek to limit aspects of the invention. For a clearer description that does not in any way limit the aspects of the invention, a 802.11ad network is considered, where clients use beamforming in transmission, the APs receive the signal in quasi-omnidirectional mode, and the APs obtain information about the beam training of the client for estimating the AoD information.

The proposed method for determining the geometric information of client devices in millimeter-wave networks comprises: i) estimating the angle information of the millimeter-wave signal of the client by means of a linear programming formulation, and ii) estimating the location of the client in real time using a modified PF.

A typical indoor 60 GHz networking with multiple APs per closed space is considered.

i) Estimation of Angles of Departure (AoD)

Figure 1:
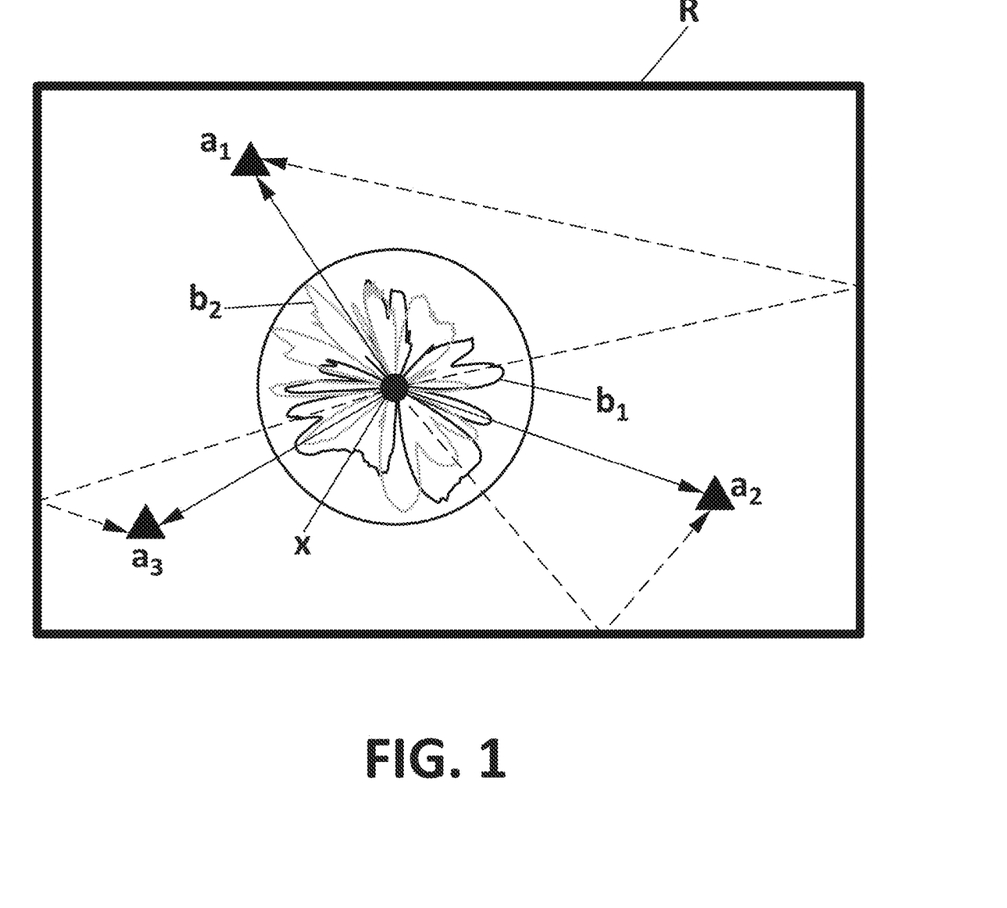
FIG. 1 shows a reference millimeter-wave scenario for locating a client.

The coordinates of the i-th AP are denoted $a_i$, and the coordinates of the client node for locating are denoted by x, as shown in FIG. 1. Furthermore, the orientation of the client node with respect to an absolute coordinate system is denoted by cp. For transmission, the client node can choose from a total of B transmission patterns, where each pattern b is defined by $p_b(\theta)$, for b=1, . . . , B, where $\theta$ is the angle of emission and $p_b(\theta)$ is the amplitude gain of pattern b towards 8.

Every time a client performs pattern training, each AP records the received signal strength indicator, RSSI, and the SNR corresponding to each pattern used by the client and detected by the AP. Then the access points send this information to a central server, where the locating process is run. The SNR, measured in dB by the i-th AP when the client node transmits with pattern b is called $\gamma_i^{(b)}$, and the corresponding amplitude of the signal is $P_{R_i}^{(b)} = 10^{\gamma_i^{(b)}/20}$.

The most critical problems for locating the client include the lack of phase information (which transforms the problem into a non-linear problem, and prevents using the most typical angular pattern decomposition algorithms), the approximate discretization of the SNR values on a log scale (with a typical resolution of 0.25 dB) and the firmware of the device (which is often too slow to record RSSI and SNR information for all the client patterns). The final problem provides incomplete measurements as output.

A typical assumption for the estimation of angles is that the energy carried along the line of sight (LoS) path from the client to any AP exceeds the energy of the non-line of sight (NLoS) paths. To find the AoD in the LoS path, $\hat{\theta}i$, which best corresponds to the SNR measurements of the APs, it is sufficient to solve the following minimum mean square error, MMSE, problem:

$$\hat{\theta}_i = \underset{\theta}{\operatorname{argmin}} \min_{\alpha} \sum_{b \in B_i} \left( P_{R_i}^{(b)} - \alpha p_b(\theta) \right)^2 \qquad \text{equation 1}$$

where $B_i$ is the set of patterns for which the AP was able to take RSSI and SNR measurements.

The irregular patterns of a commercial millimeter-wave device may generate measurements of NLoS paths (depicted as discontinuous lines in FIG. 1) with a power similar to LoS paths (depicted as solid lines in FIG. 1).

Therefore, the hypothesis that the LoS path dominates the RSSI and SNR measurements has not been verified in practice since the transmission patterns of millimeter-wave devices can emit significant power through secondary lobes, which results in a significant NLoS path energy reaching the AP. FIG. 1 shows as an example two patterns of the Talon AD7200 devices. It is considered that the client node is placed in position x and communicates with the AP in position $a_3$ through pattern $b_1$, and specifically its largest lobe directed towards the lower left angle of the room R. A secondary lobe right above the main lobe would amplify in the same manner an NLoS path reaching $a_3$, resulting in a power of the NLoS path that is not insignificant with respect to the power of the LoS path.

To avoid the preceding hypothesis, it is assumed that the received power of the millimeter-wave signals of the client node dominates the noise in SNR measurements collected by the APs. Since neither the phase information of the AP nor the weights of the phase matrix of the array are known, it is also assumed that the measured amplitude is less than the sum of the amplitude of all the paths, which represents the extreme case where all these paths constructively interfere. This enables formulating the problem of estimating AoD like the following LP, with variables $\alpha_i(\theta)$:

$$\min \sum_\theta \alpha_i(\theta)\left(\sum_{b \in B_i} pb^{(\theta)^2}\right)^{1/2} \quad \text{equation 2}$$

$$\text{s.t.} \sum_\theta \alpha_i(\theta) pb(\theta) \geq P_{R_i}^{(b)}, \forall\, b \in B_i$$

$$\alpha_i(\theta) \geq 0, \forall\, \theta \in \Theta$$

where $\Theta$ is the set of decision variables, the cardinality of which depends on solving the discretization of the angle domain. Said quantification is a design parameter, established in 400 samples in this example. The factor $(\Sigma_{b \in B_i} p_b(\theta)^2)^{1/2}$ in the target function prevents excessive weight from being assigned to the AoD for which pattern b has very high relative gain towards direction $\theta$. In addition to enabling a rapid solution, the mentioned LP problem allows a solution limited by 0. It is easy to verify that, accordingly, the number of components other than 0 in $\alpha_i$ is limited by $|B_i|$. In practice, the total number of factors $\alpha_i(\theta)$ other than 0 is usually very limited.

Figure 2:
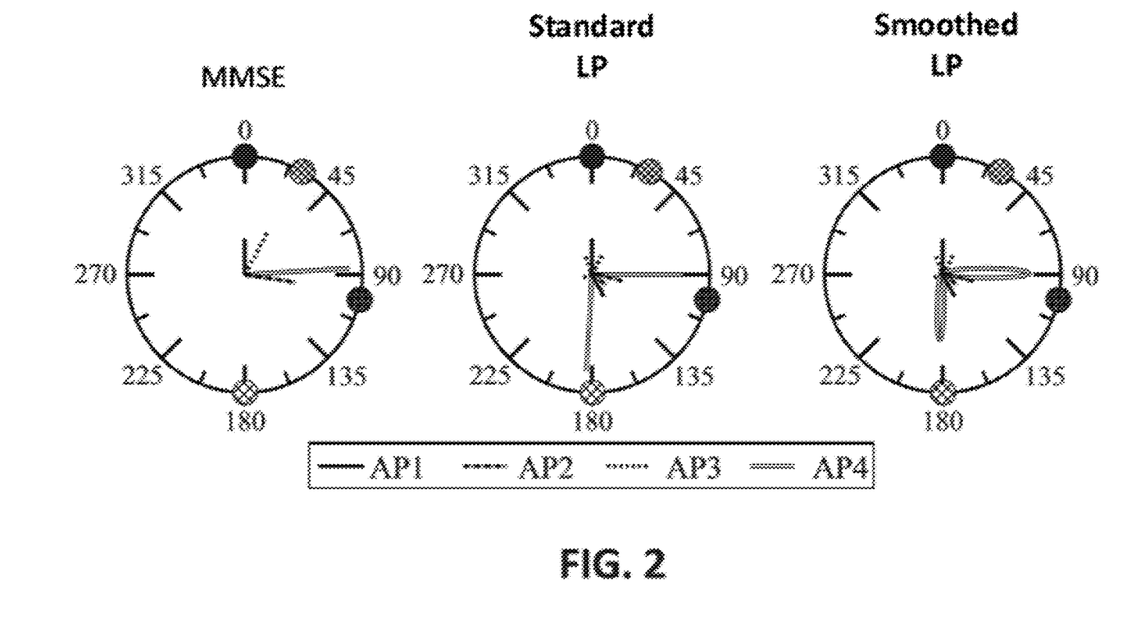
FIG. 2 shows three diagrams corresponding to three different channel decompositions, using, respectively, MMSE, linear programming, and linear programming with regularized patterns, at four access points.

As an example, in the left and central panels of FIG. 2, the outputs of the estimation of AoD obtained by four different APs, AP1, AP2, AP3, and AP4, are shown using the MMSE method of equation 1 and the LP method in equation 2, respectively. The dots in the outer circle of each sub-figure correspond to actual AoD. FIG. 2 shows that the solution of the LP problem estimates several probable directions at least one of which is, in fact, very close to the LoS path between the AP and the client. In contrast, the MMSE solution shows higher discrepancies between the estimated angle of the LoS path and the real AoD of the same path.

ii) Estimation of the Position of the Client Node

The variables $\alpha_i(\theta)$ estimated through the LP method of equation 2 can be used for estimating the position $\hat{x}$ and orientation $\varphi$ of the client node such that these geometric parameters are consistent with the AoD estimated by the different APs. The AoD of the millimeter-wave LoS path emitted by the client and estimated by the i-th AP is denoted by $\hat{\theta}_i^{x,\varphi} = \hat{\theta}_i^x + \varphi$, the client having an orientation $\varphi$. The angles $\theta_i^x$ refer to the case where the client is oriented according to a reference coordinate system, i.e., $\varphi=0$.

An angular fitness function $\mathcal{L}(x)$ is defined by a given position x of the client node, as $$\mathcal{L}(x) = \max_\varphi G^x(\varphi),$$

where $$G^x(\varphi) = \sum_i \left\langle \alpha_i, \delta_{\hat{\theta}_i^x, \varphi} \right\rangle$$

and $\delta_{\hat{\theta}_i^{x,\varphi}}(\theta)$ are the Dirac delta distribution centered at $\hat{\theta}_i^{x,\varphi}$, where $\hat{\theta}_i^{x,\varphi} = \hat{\theta}_i^x + \varphi$ and then $\delta_{\hat{\theta}_i^{x,\varphi}} = \delta_{\hat{\theta}_i^x} \otimes \delta_\varphi$; furthermore $\langle \bullet, \bullet \rangle$ denotes the internal product, and $\otimes$ denotes the circular convolution in the angle domain.

Since $$G^x(\varphi) = \sum_i H_i^x(\varphi) = \sum_i \alpha_i(\hat{\theta}_i^{x,\varphi}),$$

using Fourier transform properties, $H_i^x(\varphi) = \langle \alpha_i, \delta_{\hat{\theta}_i^{x,\varphi}} \rangle = \langle \alpha_i, \delta_{\hat{\theta}_i^x} \otimes \delta_\varphi \rangle$, which is simplified to $H_i^x = \mathcal{F}^{-1}(\mathcal{F}(\alpha_i)\mathcal{F}(\delta_{\hat{\theta}_i^x})^\dagger)$, where $\mathcal{F}(\bullet)$ and $\mathcal{F}^{-1}(\bullet)$ symbolize the discrete Fourier transform (DFT) and its inverse, respectively, and the dependence of $\varphi$ has been eliminated for the sake of clarity.

The simplified formulation used above is precise only if the estimations of the AoD are not affected by any error. To compensate for measurement errors, the variables are substituted with a version processed by means of cyclic convolution $v_i(\theta) = \alpha_i(\theta) \otimes g(\theta)$, where $g(\theta) = \exp(-\theta^2/(2\sigma_e^2))/\sqrt{2\pi\sigma_e^2}$ is a Gaussian kernel with standard deviation $\sigma_e = 10°$. The panel on the right in FIG. 2 shows the outputs of this smoothed LP form obtained through the variables $v_i(\theta)$.

A target function $\mathcal{L}(x)$ can be defined for measuring the fitness of the position estimated for a client node with respect to the power measurements taken for the set of transmission patterns used by the client node. This function can be evaluated even though the angles involved do not perfectly coincide with the angles estimated by the AP. The function is defined as:

$$\mathcal{L}(x) = \max_\varphi G^x(\varphi) \quad \text{equation 3}$$

It should be pointed out that the formula in equation 3 can be calculated very quickly since it needs only FFT/IFFT operations, product operations, and the application of operators which calculate the maximum of a set of values:

$$G^x(\varphi) = \sum_i H_i^x(\varphi) \text{ and}$$

$$H_i^x = \mathcal{F}^{-1}\left(\mathcal{F}(v_i)\mathcal{F}(\delta_{\hat{\theta}_i^x})^\dagger\right)$$

The target function $\mathcal{L}(x)$ in equation 3 is used to develop a modified PF which processes the measurements collected by the APs and locates a millimeter-wave client node as it goes, in real time.

A likelihood function $D(x)$ based on the distance is provided to determine the coherence of SNR measurements, where it is given that the user is in a certain position x. To achieve this, it is considered that the maximum SNR, in dB, measured by the i-th AP for the best transmission pattern of the client follows a log-normal distribution, contingent on a path loss model, i.e.:

$$\gamma_i^{(max)} \sim \mathcal{N}(\bar{\gamma}_i^{(max)}(\|x-a_i\|), \sigma_d^2)$$

where $\|.\|$ is the Euclidean norm and $\bar{\gamma}_i^{(max)}(\|x-a_i\|)$ is the expectation of the maximum SNR consistent with the path loss model $\bar{\gamma}_i^{(max)}(\|x-a_i\|) = \kappa - 10\eta \log_{10}(\|x-a_i\|)$.

Figure 3:
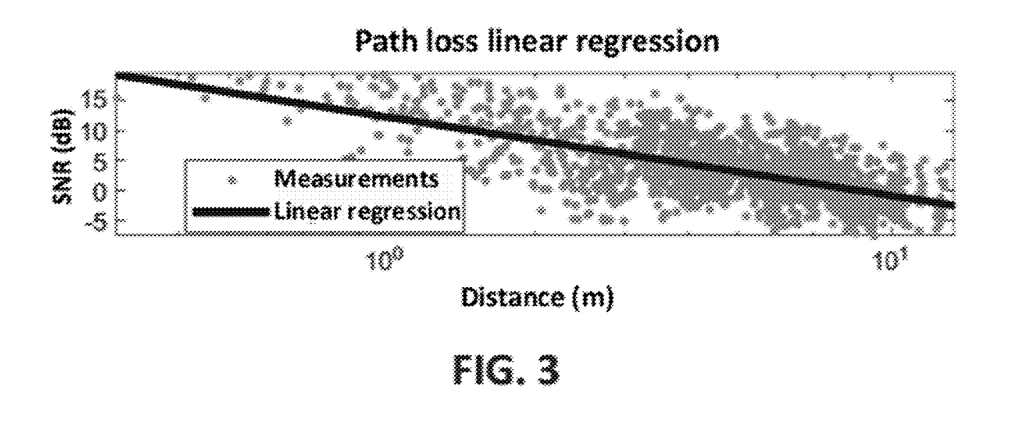
FIG. 3 shows a regression model of power loss to distance for calculating the parameters of the model used for calculating the likelihood of the SNR measurements.

Parameters $\kappa$ and $\eta$ of the loss model can be estimated by measuring pairs of values of $\bar{\gamma}_i^{(max)}(\|x-a_i\|)$ and $10\eta \log_{10}(\|x-a_i\|)$ in an empty room, for a set of chance positions and orientations of the client node and the APs. Next, linear regression is performed for estimating parameters $\kappa$ and $\eta$. The output is shown in FIG. 3. The likelihood function $D(x)$ for the maximum values of the measured SNRs can finally be written as a function of the distance between the client node and an AP i as $$\mathcal{D}(x) = \prod_i \frac{1}{\sqrt{2\pi}\,\sigma_d} \exp\left(-\frac{(\gamma_i^{(max)} - \gamma_i^{(max)}(\|x - a_i\|))^2}{2\sigma_d^2}\right) \quad \text{equation 4}$$

By way of example, in equation 4 the value of $\sigma_d$=15 dB can be established, which is large enough to cover later attenuations caused by a partial or complete blocking of the propagation of the signal. The distance probability function D(x) is used only for approximate consistency verification. In fact, the value generated by the function D(x) is not used for determining the location of the client, but rather for helping to filter out spurious solutions when more than one location is possible from the estimation of the AoD.

Figure 4:
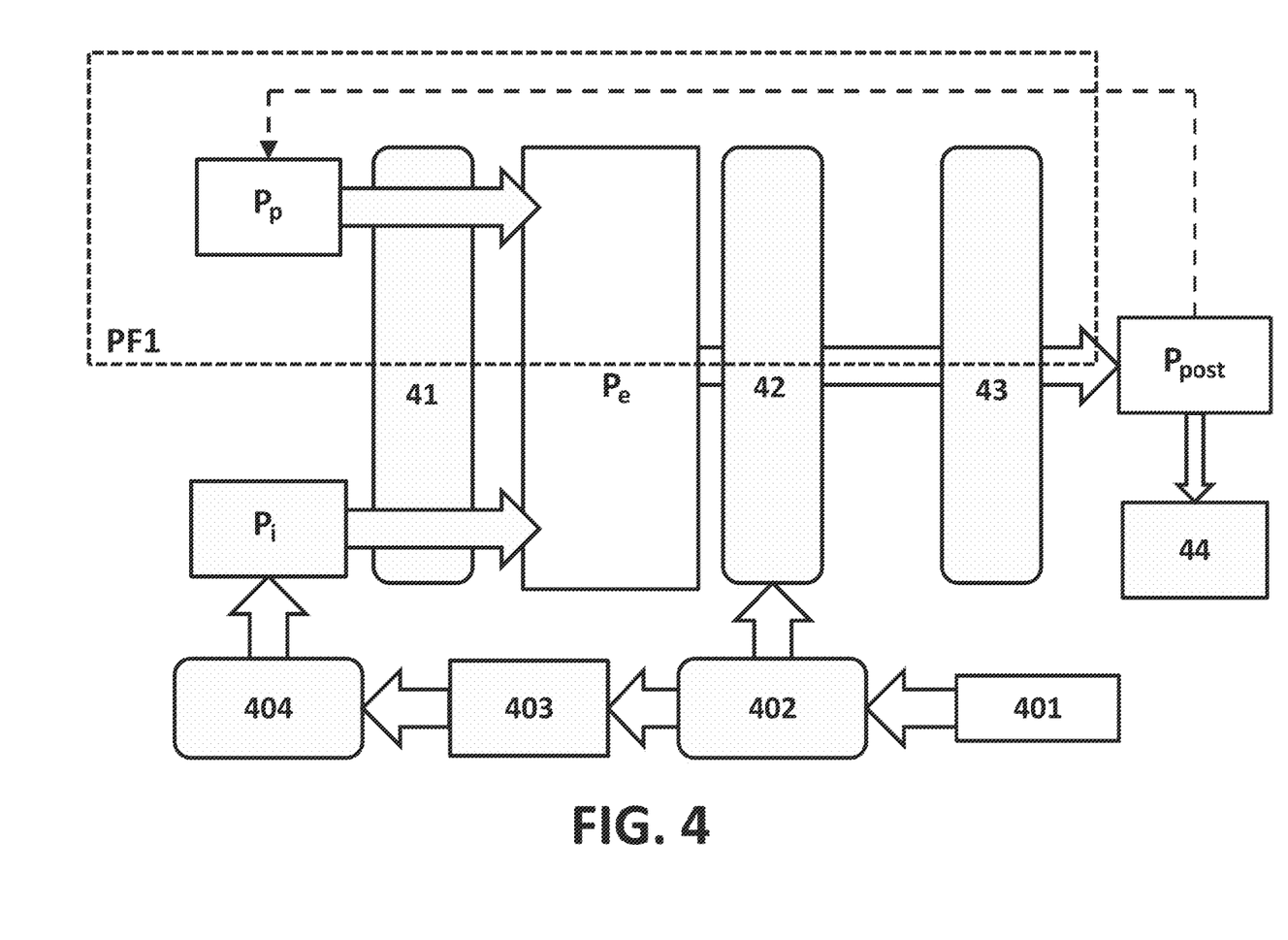
FIG. 4 shows a flow chart of a method for determining the geometric information of clients in millimeter-wave scenarios based on particles filters, according to a preferred embodiment of the invention.

The proposed method for locating the client device in real time, while it is moving in the millimeter-wave scenario, uses a modified PF, shown in the upper part of FIG. 4. The upper part PF1 of the flow chart works like a typical particle filter: the particles are randomly generated for the initialization of the algorithm. These particles are sent to the algorithm, grouped together in an initial set of particles, with the function of forming the first set of past particles $P_p$ for the first iteration. The particles evolve 41 according to a mobility model. The evolved particles $P_e$ are grouped together in a $P_{Post}$ set and constitute the $P_p$ set for the next PF loops. The fitness of the evolved particles $P_e$ is updated based on the target function $\mathcal{L}$ (x) and the likelihood function D(x), both calculated according to equations 3 and 4, respectively. These equations incorporate the measurements collected by the APs.

The method of generating particles is modified so as to be incorporated in a single "informed" particle in the initial set of particles when the APs calculate a new estimation. In detail, after collecting and processing the angles measurements 401 through the LP method 402, the "informed" particle is positioned in a location 403 that is calculated through an ADoA algorithm applied to the three angles estimated by the APs, so the variables $\alpha_i(0)$ are maximum. This solution can be calculated in a closed manner, since it is essentially an intersection of circumferences, which is obtained much more quickly than, e.g., the output of $\hat{x}$=arg $\max_x \mathcal{L}$ (x). The informed particle has zero speed and an initial fitness value equal to one to meet fitness normalization criteria. Upon creating the set of posterior particles, it is applied to fitness renormalization to prevent too large of a weight from being applied to the particles evolving from the informed particle.

As an initialization step, before any measurement, the total number of particles is randomly initialized according to a Gaussian distribution the mean and variance of which are equal to the mean and variance of the set of locations of the APs. These particles are sent to the algorithm as a set of past particles $P_p$ for the first iteration. At the beginning of each iteration, an informed particle $P_i$ is generated 404 using an ADoA algorithm applied to the AoD measurements assuming that they correspond to LoS paths. It is stressed that this could be impossible in some cases, e.g., due to the lack of the three AoD that are needed, or due to measurement errors which prevent calculating a possible solution.

If the informed particle $P_i$ can be calculated, the modified PF derives 41 a given number of particles evolved from the informed particle, and another given number of particles 41 evolved from the set of past particles, according to a mobility evolution model. In contrast, all the particles evolve from the past particles.

To cause the evolution 41 of a particle, first a particle k is randomly chosen. The method for causing the evolution 41 of an informed particle $P_i$ is identical, with the exception that in this case all the evolved particles have the same progenitor. The variables $x_k$, $v_k$, and $f_k$ refer, respectively, to the position, speed, and fitness of a particle k. The set of these three amounts constitutes the state of the particle. It should be borne in mind that each particle represents an estimation of the position of a millimeter-wave client node. A new particle evolves 41 through the following equations, which define a mobility evolution model:

$$x' = x_k + v_k \Delta t + \Delta x + t \Delta v$$

$$v' = v_k + \Delta v.$$

where the apostrophe ' indicates the state variables of the evolved particle.

This mobility evolution model is a model of uniform movement in a linear path with uncertainty $\Delta x \sim \mathcal{N}(0, \sigma_x^2 I)$ and $\Delta v \sim \mathcal{N}(0, \sigma_v^2 I)$, respectively, in position x and at speed v, and $\Delta t$ is the time that elapses between the instant of the current measurement and the instant of the preceding measurement. It is assumed that $\sigma_x$=2 $\sigma_v$=1 m/s, and the uncertainty $\Delta f$ about fitness is defined as $\Delta f = x' - (x_k + v_k \Delta t) = \Delta x + \Delta t \Delta v$, such that $\Delta f \sim \mathcal{N}(0, \sigma_x^2 + \Delta t^2 \sigma_v^2)$.

For calculating 42 the fitness value of the particles, the target function $\mathcal{L}$ (x) and the likelihood function D(x) are used, where $\mathcal{L}$ (x) and D(x) are independent of the speed of the particle, v, instead of generating $\Delta x$ and $\Delta v$ directly, a sample of $\Delta f$ is generated, and $\Delta x$ and $\Delta v$ are calculated consistent with a method of maximum likelihood, such that $\Delta f = \Delta x + t \Delta v$. It can easily be demonstrated that:

$$\Delta x = \Delta f \sigma_x^2 / (\sigma_x^2 + \Delta t^2 \sigma_v^2)$$

$$\Delta v = \Delta f \Delta t^2 \sigma_v^2 / (\sigma_x^2 + \Delta t^2 \sigma_v^2).$$

Finally, the final expression for the update of the state of the particle k is:

$$x' = x_k + v_k \Delta t + \Delta f$$

$$v' = v_k + \Delta v.$$

For updating the fitness $f_k$ of the particle k based on measurements made by the APs, the following is calculated:

$$f_k' = f_k \frac{1}{2\pi(\sigma_x^2 + \Delta t^2 \sigma_v^2)} \exp\left(-\frac{\|\Delta f\|^2}{2(\sigma_x^2 + \Delta t^2 \sigma_v^2)}\right) \mathcal{L}(x) D(x)$$

The formula includes a multiplication by $\mathcal{L}$ (x) and D(x), which provides a fitness update based on estimations of angles and SNRs derived from the measurements.

Finally, in the modified PF, the fitness value of the particles evolved from the past particles $P_p$ and from the informed particle $P_i$ are renormalized 43 by applying different weights.

After each iteration, the set of posterior particles $P_{Post}$ coming from the output of the modified PF provides 44 information about the position and the speed of the particle, and furthermore the likelihood that said position is correct (fitness). The position and the speed of each mobile client node k in the millimeter-wave network is determined by the particle characterized by the highest fitness.

It should be noted that in this text, the term "comprise" and derivatives thereof (such as "comprising", etc.) must not be understood in an express sense, i.e., these terms must not be interpreted as excluding the possibility that what is described and defined may include more elements, steps, etc.

The invention claimed is:

1. A method for determining geometric information of in millimeter-wave networks devices, comprising:
collecting measurements (401), by at least one of the devices of a millimeter-wave network, of a signal strength and a signal-to-noise ratio of a transmission received from another device of the millimeter-wave network;
the method being characterized by further comprising:
estimating angle information (402, 403) of the signals received by at least one of the devices to generate (404) a set of informed particles (Pi) input in a modified particle filter, where the set of informed particles (Pi) includes the initial value of the state of each informed particle;
the modified particle filter causing the evolution (41) of the set of informed particles (Pi) and a set of past particles (Pp) which is randomly generated and input in the modified particle filter for the initialization thereof to obtain a set of evolved particles (Pe);
causing the evolution of the set of evolved particles (Pe) to obtain a set of posterior particles (PPost) introduced in the modified particle filter;
delivering (44), by the modified particle filter as output, final values of geometric information of the at least one device from the delivered set of posterior particles (PPost).

2. The method according to claim 1, wherein estimating the angle information (402, 403) comprises the step of applying linear programming (402) to the set of collected measurements (401) of the signal strength and the signal-to-noise ratio for obtaining angle information selected from angle of departure and angle of arrival.

3. The method according to claim 1, wherein estimating the angle information (402, 403) further comprises the step of positioning informed particles (Pi) by applying the difference method of angles of arrival (403) to the estimated angle information.

4. The method according to claim 1, further comprising the step of renormalizing (43) the set of evolved particles (Pe) by means of the modified particle filter, where the renormalization (43) is applied to the particles evolved from the informed particles (Pi) and from the set of past particles, (Pp) and comprises assigning different weights to the particles evolved from the informed particles (Pi) and to the particles evolved from the past particles (Pp).

5. The method according to claim 1, wherein the state of each informed particle is selected from position, speed, and fitness.

6. The method according to claim 5, further comprising the step of the modified particle filter calculating (42) a fitness value for each evolved particle in the set of evolved particles (Pe), using the state of each informed particle.

7. The method according to claim 4, further comprising the step of renormalizing (43) the evolved fitness value for each evolved particle (Pe).

8. The method according to claim 4, further comprising (44) the step of delivering at the output the final position, speed, and fitness values of at least one of the devices corresponding to the normalization of the position, speed, and fitness of the evolved particles (Pe).

9. The method according to claim 1, where the at least one millimeter-wave network device is an access point or a client node.

10. A non-transitory computer readable data storage medium storing a computer program product for enabling a computer arrangement to replace a data source of a plurality of data sources by a replacement data source, for determining geometric information of in millimeter-wave networks devices, the non-transitory computer readable data storage medium comprising a program executable to perform: collecting measurements (401), by at least one of the devices of a millimeter-wave network, of a signal strength and a signal-to-noise ratio of a transmission received from another device of the millimeter-wave network;
estimating angle information (402, 403) of the signals received by at least one of the devices to generate (404) a set of informed particles (Pi) input in a modified particle filter, where the set of informed particles (Pi) includes the initial value of the state of each informed particle;
the modified particle filter causing the evolution (41) of the set of informed particles (Pi) and a set of past particles (Pp) which is randomly generated and input in the modified particle filter for the initialization thereof to obtain a set of evolved particles (Pe);
causing the evolution of the set of evolved particles (Pe) to obtain a set of posterior particles (PPost) introduced in the modified particle filter;
delivering (44), by the modified particle filter as output, final values of geometric information of the at least one device from the delivered set of posterior particles (PPost).

11. The non-transitory computer readable data storage medium according to claim 10, wherein estimating the angle information (402, 403) comprises the step of applying linear programming (402) to the set of collected measurements (401) of the signal strength and the signal-to-noise ratio for obtaining angle information selected from angle of departure and angle of arrival.

12. The non-transitory computer readable data storage medium according to claim 10, wherein estimating the angle information (402, 403) further comprises the step of positioning informed particles (Pi) by applying the difference method of angles of arrival (403) to the estimated angle information.

13. The non-transitory computer readable data storage medium according to claim 10, further comprising the step of renormalizing (43) the set of evolved particles (Pe) by means of the modified particle filter, where the renormalization (43) is applied to the particles evolved from the informed particles (Pi) and from the set of past particles, (Pp) and comprises assigning different weights to the particles evolved from the informed particles (Pi) and to the particles evolved from the past particles (Pp).

14. The non-transitory computer readable data storage medium according to claim 10, wherein the state of each informed particle is selected from position, speed, and fitness.

15. The non-transitory computer readable data storage medium according to claim 14, further comprising the step of the modified particle filter calculating (42) a fitness value for each evolved particle in the set of evolved particles (Pe), using the state of each informed particle.

16. The non-transitory computer readable data storage medium according to claim 13, further comprising the step of renormalizing (43) the evolved fitness value for each evolved particle (Pe).

17. The non-transitory computer readable data storage medium according to claim 13, further comprising (44) the step of delivering at the output the final position, speed, and fitness values of at least one of the devices corresponding to the normalization of the position, speed, and fitness of the evolved particles (Pe).

18. The non-transitory computer readable data storage medium according to claim 10, where the at least one millimeter-wave network device is an access point or a client node.

* * * * *